(12) United States Patent
Ogata et al.

(10) Patent No.: US 9,960,422 B2
(45) Date of Patent: May 1, 2018

(54) POSITIVE ELECTRODE ACTIVE MATERIAL FOR NONAQUEOUS ELECTROLYTE SECONDARY BATTERIES, METHOD FOR PRODUCING THE SAME, POSITIVE ELECTRODE FOR NONAQUEOUS ELECTROLYTE SECONDARY BATTERIES INCORPORATING THE POSITIVE ELECTRODE ACTIVE MATERIAL, AND NONAQUEOUS ELECTROLYTE SECONDARY BATTERY INCORPORATING THE POSITIVE ELECTRODE

(71) Applicant: SANYO Electric Co., Ltd., Daito-shi, Osaka (JP)

(72) Inventors: Atsushi Ogata, Hyogo (JP); Takeshi Ogasawara, Hyogo (JP)

(73) Assignee: SANYO Electric Co., Ltd., Daito-shi (JP)

( * ) Notice: Subject to any disclaimer, the term of this patent is extended or adjusted under 35 U.S.C. 154(b) by 63 days.

(21) Appl. No.: 14/780,956

(22) PCT Filed: Mar. 27, 2014

(86) PCT No.: PCT/JP2014/001771
§ 371 (c)(1),
(2) Date: Sep. 28, 2015

(87) PCT Pub. No.: WO2014/156165
PCT Pub. Date: Oct. 2, 2014

(65) Prior Publication Data
US 2016/0056457 A1    Feb. 25, 2016

(30) Foreign Application Priority Data
Mar. 29, 2013   (JP) .................................. 2013-073420

(51) Int. Cl.
*H01M 4/485*   (2010.01)
*H01M 10/0525*  (2010.01)
(Continued)

(52) U.S. Cl.
CPC .......... *H01M 4/485* (2013.01); *H01M 4/131* (2013.01); *H01M 4/366* (2013.01); *H01M 4/62* (2013.01);
(Continued)

(58) Field of Classification Search
CPC .......................... H01M 4/485; H01M 10/0525
See application file for complete search history.

(56) References Cited

U.S. PATENT DOCUMENTS

2002/0071990 A1   6/2002   Kweon et al.
2006/0177739 A1   8/2006   Endo et al.
(Continued)

FOREIGN PATENT DOCUMENTS

CN   1348225 A   5/2002
CN   101120463 A   2/2008
(Continued)

OTHER PUBLICATIONS

International Search Report dated Apr. 28, 2014, issued in counterpart Application No. PCT/JP2014/001771 (2 pages).
(Continued)

*Primary Examiner* — Karie O'Neill Apicella
(74) *Attorney, Agent, or Firm* — Westerman, Hattori, Daniels & Adrian, LLP

(57) ABSTRACT

A positive electrode active material according to an aspect of the present invention for nonaqueous electrolyte secondary batteries contains a lithium transition metal composite oxide that has a compound in contact with its surface, the compound containing a rare earth metal and silicic acid and/or boric acid. A positive electrode according to an aspect of the (Continued)

present invention has a positive electrode collector and a positive electrode mixture layer formed on at least one surface of the positive electrode collector. The positive electrode mixture layer contains a positive electrode active material, a binder, and a conductive agent. The positive electrode active material contains a lithium transition metal composite oxide that has a compound in contact with its surface, the compound containing a rare earth metal and silicic acid and/or boric acid.

15 Claims, 1 Drawing Sheet

(51) Int. Cl.
*H01M 10/052* (2010.01)
*H01M 4/131* (2010.01)
*H01M 4/36* (2006.01)
*H01M 4/62* (2006.01)

(52) U.S. Cl.
CPC ......... *H01M 4/626* (2013.01); *H01M 10/052* (2013.01); *H01M 10/0525* (2013.01); *H01M 2220/30* (2013.01); *Y02T 10/7011* (2013.01)

(56) References Cited

U.S. PATENT DOCUMENTS

| | | | |
|---|---|---|---|
| 2007/0298324 A1 | 12/2007 | Kawasato et al. | |
| 2008/0131778 A1* | 6/2008 | Watanabe | H01M 4/131 429/220 |
| 2009/0008602 A1 | 1/2009 | Yoshida et al. | |
| 2011/0223469 A1* | 9/2011 | Matsumoto | H01M 4/131 429/163 |
| 2011/0318653 A1 | 12/2011 | Matsumoto et al. | |

FOREIGN PATENT DOCUMENTS

| | | |
|---|---|---|
| CN | 101308926 A | 11/2008 |
| CN | 102569807 A | 7/2012 |
| JP | 2004-335278 A | 11/2004 |
| JP | 2007-280943 A | 10/2007 |
| JP | 2010-027482 A | 2/2010 |
| JP | 2010-040382 A | 2/2010 |
| JP | 2010-129470 A | 6/2010 |
| JP | 2011-192449 A | 9/2011 |
| JP | 2011-241132 A | 12/2011 |
| JP | 2012-033463 A | 2/2012 |
| WO | 2005/008812 A1 | 1/2005 |
| WO | 2014/049977 A1 | 4/2014 |
| WO | 2014/050115 A1 | 4/2014 |

OTHER PUBLICATIONS

Office Action dated Oct. 9, 2016, issued in counterpart Chinese Application No. 201480018574.X, with English translation. (15 pages).

Office Action dated Jun. 1, 2017, issued in counterpart Chinese Application No. 201480018574 (6 pages).

\* cited by examiner (A-A CROSS-SECTIONAL VIEW)

POSITIVE ELECTRODE ACTIVE MATERIAL FOR NONAQUEOUS ELECTROLYTE SECONDARY BATTERIES, METHOD FOR PRODUCING THE SAME, POSITIVE ELECTRODE FOR NONAQUEOUS ELECTROLYTE SECONDARY BATTERIES INCORPORATING THE POSITIVE ELECTRODE ACTIVE MATERIAL, AND NONAQUEOUS ELECTROLYTE SECONDARY BATTERY INCORPORATING THE POSITIVE ELECTRODE

TECHNICAL FIELD

The present invention relates to a positive electrode active material for nonaqueous electrolyte secondary batteries, a method for producing the positive electrode active material, a positive electrode for nonaqueous electrolyte secondary batteries that incorporates the positive electrode active material, and a nonaqueous electrolyte secondary battery that incorporates the positive electrode.

BACKGROUND ART

The rapid development of mobile information terminals such as cellphones, laptops, and smartphones into smaller and lighter ones in recent years has led to the demand for higher-capacity batteries as power supplies for driving them. Lithium-ion batteries, which charge and discharge through the movement of lithium ions between positive and negative electrodes, are widely used as power supplies to drive such mobile information terminals because of their high energy density and high capacity.

The above mobile information terminals are going to be higher power consumption due to their advanced video playback, gaming, and other features, leading to strong demand for higher capacities. Examples of measures to increase the capacity of a nonaqueous electrolyte secondary battery include increasing the capacity of the active material and increasing the quantity of the active material per unit area. Another way is to increase the charge voltage of the battery, but increasing the charge voltage of a battery disadvantageously makes the electrolyte more decomposable. In particular, storage or repeated charge-discharge cycles of such a battery at high temperatures affects the discharge capacity.

As a solution to this, PTL 1, for example, proposes allowing the presence of a group-3 element on the surface of particles that provide a matrix for the positive electrode active material to reduce the damage to charged storage characteristics associated with the decomposition reaction of the electrolyte that occurs at the boundary between the positive electrode active material and the electrolyte when the charge voltage is increased.

This technology disclosed in PTL 1, however, did not produce sufficient low-temperature discharge performance, although the publication mentions it reduces damage to charged storage characteristics.

CITATION LIST

Patent Literature

PTL 1: International Publication No. 2005/008812

SUMMARY OF INVENTION

Technical Problem

An object of the present invention is to provide a positive electrode active material for nonaqueous electrolyte secondary batteries that ensures sufficient low-temperature discharge performance even with a high positive-electrode potential and a method for producing the positive electrode active material, a positive electrode for nonaqueous electrolyte secondary batteries that incorporates the positive electrode active material, and a nonaqueous electrolyte secondary battery that incorporates the positive electrode.

Solution to Problem

A positive electrode active material according to an aspect of the present invention contains a lithium transition metal composite oxide having a compound in contact with its surface, the compound containing a rare earth metal and silicic acid and/or boric acid.

A method according to an aspect of the present invention for producing a positive electrode active material includes a step of adding a solution of a rare earth metal salt to a suspension containing a lithium transition metal composite oxide and a silicate and/or a borate, with the suspension at a pH of 6 or more and 10 or less.

A method according to an aspect of the present invention for producing a positive electrode active material includes a step of spraying or dripping a solution of a rare earth salt and a solution of a silicate and/or a borate separately while stirring a lithium transition metal composite oxide.

A positive electrode according to an aspect of the present invention includes a positive electrode collector and a positive electrode mixture layer formed on at least one surface of the positive electrode collector. The positive electrode mixture layer contains a positive electrode active material, a binder, and a conductive agent. The positive electrode active material contains a lithium transition metal composite oxide having a compound in contact with its surface, the compound containing a rare earth metal and silicic acid and/or boric acid.

A nonaqueous electrolyte secondary battery according to an aspect of the present invention has a positive electrode, a negative electrode, and a nonaqueous electrolyte. The positive electrode has a positive electrode collector and a positive electrode mixture layer formed on at least one surface of the positive electrode collector. The positive electrode mixture layer contains a positive electrode active material, a binder, and a conductive agent. The positive electrode active material contains a lithium transition metal composite oxide having a compound in contact with its surface, the compound containing a rare earth metal and silicic acid and/or boric acid.

Advantageous Effects of Invention

According to an aspect of the present invention, there are provided a positive electrode active material for nonaqueous electrolyte secondary batteries and a method for producing the positive electrode active material, a positive electrode for nonaqueous electrolyte secondary batteries, and a nonaqueous electrolyte secondary battery for tremendously improved low-temperature discharge performance.

DESCRIPTION OF EMBODIMENTS

Figure 1:
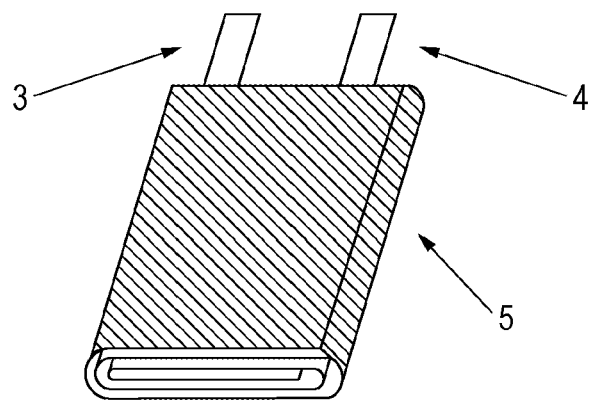
FIG. 1 is a schematic perspective diagram that illustrates an example of a structure of a nonaqueous electrolyte secondary battery according to an embodiment.

The following describes an embodiment of the present invention. This embodiment is an example of a way of implementing the present invention. The present invention is not limited to this embodiment.

A positive electrode active material for nonaqueous electrolyte secondary batteries as an example of this embodiment is characterized by a lithium transition metal composite oxide that has a compound in contact with part of its surface, the compound containing a rare earth metal and silicic acid and/or boric acid. This contact of a compound containing a rare earth metal and silicic acid and/or boric acid with the surface of a lithium transition metal composite oxide reduces the activation energy involved in the mutual acceptance of lithium ions between the lithium transition metal composite oxide and the electrolyte, thereby improving ionic conductivity. As a result, the low-temperature discharge performance is improved.

Part of the compound may be inside the lithium transition metal composite oxide. When the compound is in contact with the surface of the lithium transition metal composite oxide, the compound may be in contact with the surface of primary particles of the lithium transition metal composite oxide in addition to the surface of secondary particles. This is because the decrease in the activation energy involved in the mutual acceptance of lithium ions between the lithium transition metal composite oxide and the electrolyte and the resulting improvement of ionic conductivity are ensured when the compound is in contact with at least either primary or secondary particles of the lithium transition metal composite oxide.

Examples of typical composition formulae of compounds containing a rare earth metal and silicic acid include compounds represented by $Ln_2Si_2O_5$, $Ln_2SiO_7$, and $A_xLn_ySiO_z$ (A=an alkali metal, Ln=a rare earth metal, $0 \leq x < 4$, $0 < y \leq 2$, and z is the value that makes the charge of the compound 0). It is preferred that the compound containing a rare earth metal and silicic acid be a compound consisting of a rare earth metal, silicic acid, and an alkali metal or a compound consisting of a rare earth metal and silicic acid. In particular, it is preferred that this compound be a compound consisting of a rare earth metal and silicic acid.

Examples of typical composition formulae of compounds containing a rare earth metal and boric acid include compounds represented by $LnBO_3$, $A_aLn_b(BO_3)_3$ (A=an alkali metal, Ln=a rare earth metal, $0 \leq a < 3$, and $0 < b \leq 2$), and $B_cLn_d(BO_3)_4$ (B=an alkaline-earth metal, Ln=a rare earth metal, $0 \leq c < 3$, and $0 < d \leq 2$). It is preferred that the compound containing a rare earth metal and boric acid be a compound consisting of a rare earth metal, boric acid, and an alkali metal or a compound consisting of a rare earth metal and boric acid. In particular, it is preferred that this compound be a compound consisting of a rare earth metal and boric acid.

It is desirable that the compound containing a rare earth metal and silicic acid and/or boric acid be in adhesion to the surface of the lithium transition metal composite oxide. Ensuring the compound containing a rare earth metal and silicic acid and/or boric acid is in contact with and adhesion to the surface of the lithium transition metal composite oxide helps the active material maintain the aforementioned advantageous effects for a long period. This is because when the positive electrode active material is kneaded with a conductive agent or similar, such a structure prevents the compound containing a rare earth metal and silicic acid and/or boric acid from detaching from the lithium transition metal composite oxide and helps to keep the compound in adhesion.

It is desirable that the average particle diameter of the compound containing a rare earth metal and silicic acid and/or boric acid be 1 nm or more and 100 nm or less. When the average particle diameter of the compound is less than 1 nm, the surface of the lithium transition metal composite oxide is densely coated with the compound. Because of the poor electronic conductivity of the compound, this situation may affect the transfer of electrons and lead to reduced discharge performance. When having an average particle diameter exceeding 100 nm, however, the compound is in contact with the lithium transition metal composite oxide in a small area. This limits the effects such as the prevention of side reactions between the lithium transition metal composite oxide and the electrolyte, e.g., the decomposition of the electrolyte, and the reduction of the activation energy involved in the movement of lithium ions.

A positive electrode for nonaqueous electrolyte secondary batteries as an example of this embodiment includes a positive electrode collector and a positive electrode mixture layer formed on at least one surface of the positive electrode collector. The positive electrode mixture layer contains a positive electrode active material, a binder, and a conductive agent. The positive electrode active material contains a lithium transition metal composite oxide that has a compound in contact with its surface, the compound containing a rare earth metal and silicic acid and/or boric acid.

Production of a positive electrode active material for nonaqueous electrolyte secondary batteries as an example of this embodiment involves adding a solution of a rare earth metal salt to a suspension containing a lithium transition metal composite oxide and a silicate and/or a borate.

When this method is used, it is desirable that the pH of the suspension be 6 or more and 10 or less. This is because at a pH of less than 6 the lithium transition metal composite oxide may dissolve, and at a pH exceeding 10 impurities such as rare earth hydroxides may form upon the addition of the solution of a compound containing a rare earth metal. The pH can be adjusted using an acidic or basic aqueous solution. Examples of acidic solutions include solutions that contain an inorganic acid, e.g., hydrochloric acid, sulfuric acid, or nitric acid, or an organic acid, e.g., acetic acid, formic acid, or oxalic acid. Examples of basic solutions include solutions that contain lithium hydroxide, sodium hydroxide, potassium hydroxide, an ammonium, or similar.

Methods of this type allow a compound containing a rare earth metal and silicic acid and/or boric acid to come into contact with (if the above method is used, adhere to) the surface of the lithium transition metal composite oxide. In particular, the use of the above method yields a greater improvement of low-temperature discharge characteristics by not only allowing the compound to adhere to the surface of the lithium transition metal composite oxide but also ensuring uniform dispersion of the adhering compound.

Note that how to bring the compound into contact with the surface of the lithium transition metal composite oxide is not limited to the above method. For example, it is possible to use a method in which a powder of a lithium transition metal composite oxide and a powder of a compound containing a rare earth metal and silicic acid and/or boric acid are mechanically mixed. Mechanical mixing-based methods can be performed using machines such as dry particle mixers, including grinders, ball mills, Mechanofusion, and Nobilta.

The compound can also be brought into contact with (adhesion to) the surface of the lithium transition metal composite oxide using a method in which a solution of a rare earth salt and a solution of a silicate and/or a borate are separately sprayed or dripped onto a particulate powder of the lithium transition metal composite oxide while this particulate powder is stirred. A method can also be used in which a solution of a rare earth salt and a silicate and/or a borate is sprayed or dripped onto a particulate powder of the lithium transition metal composite oxide while this particulate powder is stirred.

In these mechanical mixing-based methods, the powder of the compound containing a rare earth metal and silicic acid and/or boric acid is in contact with the powder of the lithium transition metal composite oxide in part but does not intimately adhere to the lithium transition metal composite oxide. The use of a mechanical mixing-based method can therefore limit the effects such as the prevention side reactions, e.g., the decomposition of the electrolyte, and the reduction of the activation energy involved in the movement of lithium ions by making it more likely that the powder of the compound detaches from the lithium transition metal composite oxide during the preparation of positive electrode mixture slurry.

In the above methods for bringing the compound into contact with (adhesion to) the surface of the lithium transition metal composite oxide, the compound containing a rare earth metal and silicic acid and/or boric acid intimately adheres to the lithium transition metal composite oxide because the compound separates out on the lithium transition metal composite oxide. This allows the compound and the lithium transition metal composite oxide to exist as a powder in which they have integrated with each other. This makes it less likely that the powder of the compound detaches from the lithium transition metal composite oxide during the preparation of positive electrode mixture slurry, facilitating effects such as the prevention of side reactions, e.g., the decomposition of the electrolyte, and the reduction of the activation energy involved in the movement of lithium ions.

It is therefore preferred to use any above method for bringing the compound into contact with (adhesion to) the surface of the lithium transition metal composite oxide, as compared to mechanical mixing-based methods, to make the compound into contact with the surface of the lithium transition metal composite oxide.

It is desirable that the proportion of the compound containing a rare earth metal and silicic acid and/or boric acid to the lithium transition metal composite oxide be 0.01% by mass or more and 2.0% by mass or less on a rare earth element basis. This is because if this proportion is less than 0.01% by mass, the effects produced may be insufficient because of too small a quantity of the compound adhering to the surface of the lithium transition metal composite oxide, and if this proportion exceeds 2.0% by mass, the charge and discharge characteristics of the battery is affected by the resulting difficulty in the transfer of electrons between one active material and the other, the active materials and the conductive agent, the active materials and the collectors, and other combinations.

Examples of the silicate include silicic acid, ammonium silicate, compounds of alkali (alkaline earth) metals and silicic acid such as sodium silicate, potassium silicate, magnesium silicate, calcium silicate, and hexafluorosilicates as well as silicon alkoxides such as ethyl silicate.

Examples of the borate include boron oxide, boric acid, borates such as ammonium borate, metaboric acid, sodium metaborate, lithium metaborate, and potassium tetraborate, borohydrides such as potassium borohydride and sodium borohydride, tetrahydroborates such as sodium tetrahydroborate, fluoroborates such as lithium tetrafluoroborate, sodium tetrafluoroborate, and tetraethylammonium tetrafluoroborate, and peroxoborates such as sodium peroxoborate and potassium peroxoborate.

It is preferred that the quantity of the silicate and/or borate per % by mass of the rare earth metal be 0.01% by mass or more and 10% by mass or less on an elemental silicon and/or elemental boron basis. This is because if the quantity of the silicate and/or borate is 0.01% by mass or less, the effects of the compound containing a rare earth metal salt and a silicate and/or a borate are poor, and if it exceeds 10% by mass, the quantity of the compound is wastefully large.

Examples of rare earth salts include sulfates, nitrates, chlorides, acetates, and oxalates. The rare earth metal can be at least one selected from metals such as scandium, yttrium, lanthanum, cerium, praseodymium, neodymium, samarium, europium, gadolinium, terbium, dysprosium, holmium, erbium, thulium, ytterbium, and lutetium. In particular, it is preferred that the rare earth metal be at least one metal selected from lanthanum, neodymium, samarium, erbium, and ytterbium.

It is desirable that after the compound containing a rare earth metal and silicic acid and/or boric acid is brought into contact with (adhesion to) the surface of the lithium transition metal composite oxide, the resulting material be heated at 600° C. or less. This means that the positive electrode active material produced using any above method may be heated in an oxidizing or reducing atmosphere or under reduced pressure. Any heating temperature exceeding 600° C. in this heat treatment not only causes the compound adhering to the surface of the lithium transition metal composite oxide to decompose and the compound to aggregate with the temperature rise but also leads to the compound diffusing into the lithium transition metal composite oxide. Any event of this type can reduce the effect of the compound in preventing reactions between the electrolyte and the positive electrode active material. It is therefore desirable that the heat treatment be at a heating temperature of 600° C. or less if performed. For adequate removal of water, however, it is preferred that the heating temperature be 80° C. or more.

(Additional Information)

(1) Examples of positive electrode active materials in the present invention include lithium transition metal composite oxides containing transition metals such as cobalt, nickel, and manganese. Specific examples include lithium cobalt oxide, lithium Ni—Co—Mn composite oxides, lithium Ni—Mn—Al composite oxides, lithium Ni—Co—Al composite oxides, lithium Co—Mn composite oxides, salts of an oxoacid and iron, manganese, or any other transition metal ($LiMPO_4$, and $LiMBO_3$, where M is selected from Fe, Mn, Co, and Ni). These can be used alone or in mixture.

(2) The lithium transition metal composite oxide may be in the form of a solid solution with substances such as Mg, Ti, and Zr, and may also contain these substances in grain boundaries. Compounds containing an alkali metal, elemental fluorine, and a rare earth metal may be in adhesion to the surface of the composite oxide, as well as compounds of elements such as Al, Mg, Ti, and Zr. This is because the adhesion of these compounds also contributes to the prevention of the contact between the electrolyte and the positive electrode active material.

(3) The lithium Ni—Co—Mn composite oxide can be one with a composition in which the molar ratio of Ni to Co to Mn is 1:1:1, and it is also possible to use one with any known composition such as compositions in which the molar ratio is 5:3:2, 6:2:2, 7:1:2, 7:2:1, or 8:1:1. In particular, it is preferred to use one that contains higher proportions of Ni and Co than Mn so that the capacity of the positive electrode can be increased. It is preferred that the difference between Ni and Mn in the molar proportion to the total number of moles of Ni, Co, and Mn be 0.05% or more.

(4) The solvent for the nonaqueous electrolyte used in the present invention is not limited and can be a conventional solvent for nonaqueous electrolyte secondary batteries. Examples of solvents that can be used include cyclic carbonates such as ethylene carbonate, propylene carbonate, butylene carbonate, and vinylene carbonate, linear carbonates such as dimethyl carbonate, methyl ethyl carbonate, and diethyl carbonate, ester-containing compounds such as methyl acetate, ethyl acetate, propyl acetate, methyl propionate, ethyl propionate, and γ-butyrolactone, compounds containing a sulfone group such as propanesultone, ether-containing compounds such as 1,2-dimethoxyethane, 1,2-diethoxyethane, tetrahydrofuran, 1,2-dioxane, 1,4-dioxane, and 2-methyltetrahydrofuran, nitrile-containing compounds butyronitrile, valeronitrile, n-heptanenitrile, succinonitrile, glutaronitrile, adiponitrile, pimelonitrile, 1,2,3-propanetricarbonitrile, and 1,3,5-pentanetricarbonitrile, and amide-containing compounds such as dimethylformamide. In particular, solvents obtained through the substitution of some of their H with F are preferably used. These can be used alone or as a combination of two or more of them. In particular, combinations of cyclic and linear carbonates, with or without a small amount of a nitrile- or ether-containing compound, are preferred.

(5) The solute for the nonaqueous electrolyte used in the present invention is not limited either and can be a known lithium salt commonly used in nonaqueous electrolyte secondary batteries. Such a lithium salt can be a lithium salt that contains one or more elements selected from P, B, F, O, S, N, and Cl. Specific examples include $LiPF_6$, $LiBF_4$, $LiN(SO_2F)_2$, $LiN(SO_2CF_3)_2$, $LiN(SO_2C_2F_5)_2$, $LiPF_{6-x}(C_nF_{2n-1})_x$ (where $1<x<6$, $n=1$ or 2), and so forth, as well as lithium salts containing an oxalate complex as anion and $LiPF_2O_2$ and similar salts.

The solute can also be a lithium salt that contains an oxalate complex as anion. This lithium salt containing an oxalate complex as anion can be LiBOB [lithium-bisoxalatoborate], and can also be a lithium salt that has an anion in which $C_2O_4^{2-}$ coordinates to a central atom, e.g., one represented by $Li[M(C_2O_4)_xR_y]$ (where M is a transition metal selected from groups IIIb, IVb, and Vb in the periodic table, R is a group selected from halogens, alkyl groups, and halogenated alkyl groups, x is a positive integer, and y is 0 or a positive integer). Specific examples include $Li[B(C_2O_4)F_2]$, $Li[P(C_2O_4)F_4]$, and $Li[P(C_2O_4)_2F_2]$. For a stable coating to be formed on the surface of the negative electrode even under high-temperature conditions, however, it is the most preferred to use LiBOB.

Not only are these solutes used alone, they can also be used as a mixture of two or more of them. The concentration of the solute is not limited. However, it is desirable that it be 0.8 to 1.7 moles per liter of the electrolyte. In applications that involve high-rate discharge, it is desirable that the concentration of the solute be 1.0 to 1.6 moles per liter of the electrolyte.

(6) The negative electrode used in the present invention can be a conventional negative electrode. Examples include, in particular, carbon materials capable of storing and releasing lithium, metals capable of forming alloys with lithium, and alloy compounds that contain such metals.

Carbon materials that can be used include graphite such as natural graphite, non-graphitizable carbon, and artificial carbon as well as coke, and examples of alloy compounds include those containing at least one metal capable of forming alloys with lithium. It is preferred the element capable of forming alloys with lithium be silicon or tin in particular, and their oxygen-bound forms, such as silicon oxide and tin oxide, can also be used. Furthermore, mixtures of the above carbon materials and silicon or tin compounds can be used.

It is also possible to use a negative electrode made of lithium titanate or any other material whose charge and discharge potentials referred to metallic lithium are higher than those of carbon materials or similar, although this affects the energy density.

(7) A conventional inorganic filler layer may be formed in the boundary between the positive electrode and the separator or the boundary between the negative electrode and the separator. The filler can also be conventional one, i.e., an oxide or phosphoric acid compound that contains one or more of elements such as titanium, aluminum, silicon, and magnesium or its derivative obtained through surface treatment with a hydroxide or similar.

The filler layer can be formed using a method in which this layer is formed through direct application of filler-containing slurry to the positive electrode, negative electrode, or separator, a method that involves attaching a sheet of filler to the positive electrode, negative electrode, or separator, or any similar method.

(8) The separator used in the present invention can be a conventional separator. To be specific, not only can the separator be a polyethylene separator, it may also be a polyethylene layer with a polypropylene layer on its surface or a polyethylene separator that has its surface coated with an aramid or similar polymer.

EXAMPLES

The following describes a positive electrode active material for nonaqueous electrolyte secondary batteries, a positive electrode, and a battery according to the present invention. Note that the positive electrode active materials for nonaqueous electrolyte secondary batteries, positive electrodes, and batteries in the present invention are not limited to those illustrated by the following forms and can be implemented with any necessary change unless their gist is altered.

First Experiment

Experimental Example 1

Production of a Positive Electrode Active Material

First, 1000 g of particles of lithium cobalt oxide were prepared in the form of a solid solution with 1.0% by mole each of Mg and Al with respect to lithium cobalt oxide and containing 0.04% by mole Zr, and 3.0 L of purified water was stirred with these particles to form a suspension of lithium cobalt oxide. An aqueous solution of 1.45 g of sodium silicate (0.014% by mass on an elemental silicon basis) in 100 mL of purified water was then added to this suspension. An aqueous solution of 2.26 g of erbium nitrate pentahydrate (0.085% by mass on an elemental erbium basis) in 200 mL of purified water was then added to the suspension. While the solution of erbium nitrate pentahydrate was added to the suspension, a 10% by mass aqueous solution of nitric acid or a 10% by mass aqueous solution of sodium hydroxide was added to the suspension as necessary to adjust the pH to 7.

After the completion of the addition of the erbium nitrate pentahydrate solution, the suspension was suction-filtered, and the residue was washed with water. The obtained powder was dried at 120° C., yielding a material composed of lithium cobalt oxide and compounds containing erbium and silicic acid uniformly dispersed on and adhering to its surface. The obtained powder was heated in the air at 300° C. for 5 hours. This yielded a powder of a positive electrode active material.

The ICP-measured elemental abundance of the obtained positive electrode active material was 0.085% by mass on an elemental erbium basis and 0.014% by mass on an elemental silicon basis with respect to lithium cobalt oxide. The molar ratio of the rare earth metal to elemental silicon was Among the compounds containing erbium and silicic acid adhering to the surface of lithium cobalt oxide, a compound consisting of erbium and silicic acid ($Er_2Si_2O_5$) was predominant. In some cases, however, compounds consisting of erbium, silicic acid, and an alkali metal may be in adhesion to the surface of lithium cobalt oxide.

[Production of a Positive Electrode]

Positive electrode mixture slurry was prepared by kneading the above positive electrode active material powder, a powder of carbon black (acetylene black) (average particle diameter: 40 nm) as a positive electrode conductive agent, and polyvinylidene fluoride (PVdF) as a positive electrode binder in an NMP solution to proportions of 95:2.5:2.5 on a mass ratio basis. Lastly, this positive electrode mixture slurry was applied to both surfaces of a positive electrode collector made from aluminum foil, the applied coatings were dried, and the collector was then rolled using a roller. This yielded a positive electrode composed of a positive electrode collector and a positive electrode mixture layer formed on both surfaces of it. The packing density of the positive electrode was set at 3.7 g/cm$^3$.

[Production of a Negative Electrode]

First, negative electrode mixture slurry was prepared by mixing artificial graphite as a negative electrode active material, CMC (sodium carboxymethylcellulose) as a dispersant, and SBR (styrene-butadiene rubber) as a binder in an aqueous solution to a mass ratio of 98:1:1. This negative electrode mixture slurry was uniformly applied to both surfaces of a negative electrode collector made from copper foil. The applied coatings were then dried, and the collector was then rolled using a roller. This yielded a negative electrode composed of a negative electrode collector and a negative electrode mixture layer formed on both surfaces of it. The density of the packing of the negative electrode active material in this negative electrode was 1.60 g/cm$^3$.

[Preparation of a Nonaqueous Electrolyte]

A nonaqueous electrolyte was prepared by dissolving lithium phosphate hexafluoride ($LiPF_6$) to a concentration of 1.0 mol/liter in a solvent mixture containing ethylene carbonate (EC) and diethyl carbonate (DEC) in a volume ratio of 3:7.

[Production of a Battery]

Figure 2:
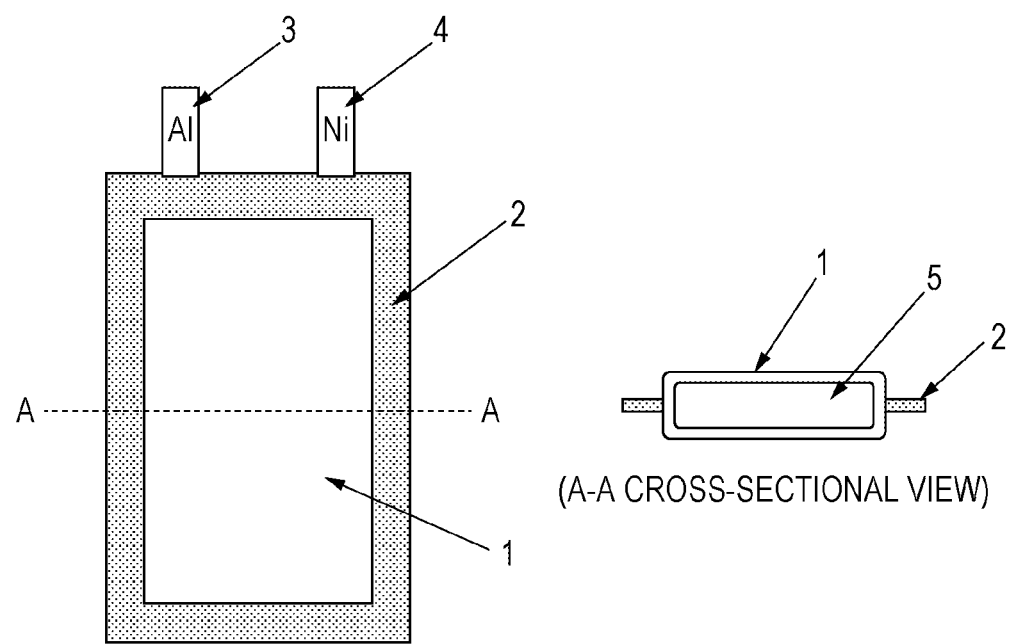
FIG. 2 is a schematic top view of an example of a structure of a nonaqueous electrolyte secondary battery according to an embodiment.

A positive electrode collector tab 3 and a negative electrode collector tab 4 were attached to each of the positive and negative electrodes. The two electrodes were wound into a spiral with a separator placed therebetween, and then the winding core was removed to form a spiral electrode body. This spiral electrode body was then pressed into a flat electrode body 5. This flat electrode body 5 and the aforementioned nonaqueous electrolyte were placed in a sheathing body 1 made from laminated aluminum, and the heat-seal opening 2 of the laminated aluminum sheathing body was weld, producing a nonaqueous electrolyte secondary battery having a structure illustrated in FIGS. 1 and 2. The size of the nonaqueous electrolyte secondary battery was 3.6 mm×35 mm×62 mm, and the discharge capacity of the nonaqueous electrolyte secondary battery upon charge to 4.40 V and discharge to 2.75 V was 750 mAh.

The battery produced in this way is hereinafter referred to as battery A1.

Experimental Example 2

A battery was produced in the same way as in Experimental Example 1, except that 1.45 g of sodium silicate was replaced with 2.9 g of sodium silicate (0.028% by mass on an elemental silicon basis) and that 2.26 g of erbium nitrate pentahydrate was replaced with 4.53 g of erbium nitrate pentahydrate (0.171% by mass on an elemental erbium basis). The ICP-measured elemental abundance was 0.171% by mass on an elemental erbium basis and 0.028% by mass on an elemental silicon basis with respect to lithium cobalt oxide. The molar ratio of the rare earth metal to elemental silicon was 1:1.

The battery produced in this way is hereinafter referred to as battery A2.

Experimental Example 3

A battery was produced in the same way as in Experimental Example 1, except that the heating conditions were changed from heating in the air at 300° C. for 5 hours to heating in the air at 120° C. for 2 hours. The ICP-measured elemental abundance was 0.085% by mass on an elemental erbium basis and 0.014% by mass on an elemental silicon basis with respect to lithium cobalt oxide. The molar ratio of the rare earth metal to elemental silicon was 1:1.

The battery produced in this way is hereinafter referred to as battery A3.

Experimental Example 4

An active material and a battery were produced in the same way as in Experimental Example 2, except that the pH of the suspension containing lithium cobalt oxide and sodium silicate was changed from 7 to 9. The ICP-measured elemental abundance was 0.171% by mass on an elemental erbium basis and 0.028% by mass on an elemental silicon basis with respect to lithium cobalt oxide. The molar ratio of the rare earth metal to elemental silicon was 1:1.

The battery produced in this way is hereinafter referred to as battery A4.

Experimental Example 5

A battery was produced in the same way as in Experimental Example 1, except that 2.26 g of erbium nitrate pentahydrate was replaced with 2.21 g of lanthanum nitrate hexahydrate. The ICP-measured elemental abundance was 0.071% by mass on an elemental lanthanum basis and 0.014% by mass on an elemental silicon basis with respect to lithium cobalt oxide. The molar ratio of the rare earth metal to elemental silicon was 1:1.

The battery produced in this way is hereinafter referred to as battery A5.

Experimental Example 6

A battery was produced in the same way as in Experimental Example 1, except that 2.26 g of erbium nitrate pentahydrate was replaced with 2.24 g of neodymium nitrate hexahydrate. The ICP-measured elemental abundance was 0.074% by mass on an elemental neodymium basis and 0.014% by mass on an elemental silicon basis with respect to lithium cobalt oxide. The molar ratio of the rare earth metal to elemental silicon was 1:1.

The battery produced in this way is hereinafter referred to as battery A6.

Experimental Example 7

A battery was produced in the same way as in Experimental Example 1, except that 2.26 g of erbium nitrate pentahydrate was replaced with 2.27 g of samarium nitrate hexahydrate. The ICP-measured elemental abundance was 0.077% by mass on an elemental samarium basis and 0.014% by mass on an elemental silicon basis with respect to lithium cobalt oxide. The molar ratio of the rare earth metal to elemental silicon was 1:1.

The battery produced in this way is hereinafter referred to as battery A7.

Experimental Example 8

A battery was produced in the same way as in Experimental Example 1, except that 2.26 g of erbium nitrate pentahydrate was replaced with 2.11 g of ytterbium nitrate trihydrate. The ICP-measured elemental abundance was 0.088% by mass on an elemental ytterbium basis and 0.014% by mass on an elemental silicon basis with respect to lithium cobalt oxide. The molar ratio of the rare earth metal to elemental silicon was 1:1.

The battery produced in this way is hereinafter referred to as battery A8.

Experimental Example 9

A battery was produced in the same way as in Experimental Example except that the positive electrode active material used was lithium cobalt oxide that had no compounds containing erbium and silicic acid adhering to its surface (a non-surface-modified positive electrode active material).

The battery produced in this way is referred to as battery A9.

Experimental Example 10

A battery was produced in the same way as in Experimental Example 4, except that the aqueous solution of 1.45 g of sodium silicate in 100 mL of purified water was replaced with purified water alone and that the quantity of erbium nitrate pentahydrate was changed from 4.53 g to 2.26 g. The ICP-measured elemental abundance was 0.085% by mass on an elemental erbium basis with respect to lithium cobalt oxide.

The battery produced in this way is hereinafter referred to as battery A10.

(Experiment)

Batteries A1 to A10 were charged and discharged under the following conditions.

[Charging and Discharging Conditions in Cycle 1]

Charging Conditions in Cycle 1

Constant-current charging was performed at a current of 1.0 It (750 mA) until the battery voltage reached 4.40 V. Constant-voltage charging was then performed at a voltage of 4.40 V until the current reached 37.5 mA.

Discharging Conditions in Cycle 1

Constant-current discharge was performed at a current of 1.0 It (750 mA) until the battery voltage reached 2.75 V.

Halt

The duration of the halt between the above charging and discharge was set at 10 minutes.

[Measurement of Discharge Capacity at 25° C.]

The discharge capacity $Q1$ (25° C. discharge capacity $Q1$) was measured through a round of charge-discharge cycle testing at 25° C. under the above conditions.

[Measurement of Discharge Capacity at −20° C.]

At 25° C., the battery was subjected to constant-current charging at a current of 1.0 It (750 mA) until a battery voltage of 4.40 V and then charged at a constant voltage of 4.40 V until the current reached (1/20) It (37.5 mA). The battery was then left in a thermostat at −20° C. for 4 hours. The discharge capacity $Q2$ (−20° C. discharge capacity $Q2$) was then measured through constant-current discharge performed at a current of 1.0 It (750 mA) until a battery voltage of 2.75 V.

[Percent Retained Discharge Capacity at Low Temperatures]

The percent retained discharge capacity at low temperatures was determined using equation (1) below. The results are summarized in Table 1.

$$\text{Percent retained discharge capacity at low temperatures (\%)} = (-20° \text{C. discharge capacity } Q2/25° \text{C. discharge capacity } Q1) \times 100(\%) \quad (1)$$

TABLE 1

| Battery | Rare earth metal | Rare earth metal content (% by mass) | Elemental silicon content (% by mass) | Rare earth metal to elemental silicon molar ratio | Percent retained discharge capacity at low temperatures (%) |
|---|---|---|---|---|---|
| A1 | Er | 0.085 | 0.014 | 1:1 | 72 |
| A2 | Er | 0.171 | 0.028 | 1:1 | 67 |
| A3 | Er | 0.085 | 0.014 | 1:1 | 72 |
| A4 | Er | 0.171 | 0.028 | 1:1 | 68 |
| A5 | La | 0.071 | 0.014 | 1:1 | 70 |
| A6 | Nd | 0.074 | 0.014 | 1:1 | 71 |
| A7 | Sm | 0.077 | 0.014 | 1:1 | 71 |
| A8 | Yb | 0.088 | 0.014 | 1:1 | 70 |
| A9 | — | — | — | — | 53 |
| A10 | Er | 0.085 | — | — | 64 |

As is clear from Table 1, batteries A1 to A8, which incorporated a lithium cobalt oxide surface-modified with compounds containing erbium and silicic acid, exhibited a high percent retained discharge at low temperatures compared with batteries A9 and A10.

The reason for this result should be as follows. The lithium cobalt oxide used in Batteries A1 to A8 had compounds containing erbium and silicic acid adhering to its surface. This compound reduced the activation energy associated with the mutual acceptance of lithium ions between the surface of lithium cobalt oxide and the electrolyte. The resulting improvement of ionic conductivity should be the reason for the tremendously improved low-temperature discharge performance of these batteries. Battery A9, which incorporated no compounds containing erbium and silicic acid, displayed no signs of such effects. As for A10, such synergistic effects were insufficient and the percent retained discharge capacity at low temperatures did not improve, seemingly because erbium oxyhydroxide existed in this battery but not in the form of compounds with silicic acid.

Second Experiment

Experimental Example 11

Production of a Positive Electrode Active Material

First, 1000 g of particles of lithium cobalt oxide were prepared in the form of a solid solution with 1.0% by mole each of Mg and Al with respect to lithium cobalt oxide and containing 0.04% by mole Zr. Then while these 1000 g of lithium cobalt oxide particles were stirred, two solutions were separately sprayed onto and mixed with the particles: an aqueous solution of 2.26 g of erbium nitrate pentahydrate (0.085% by mass on an elemental erbium basis) in 50 mL of purified water and an aqueous solution of 0.28 g of ammonium borate octahydrate (0.006% by mass on an elemental boron basis).

The powder obtained after the completion of the spraying of aqueous solutions was dried at 120° C., yielding a material composed of lithium cobalt oxide and compounds containing erbium and boric acid adhering to its surface. The obtained powder was heated in the air at 300° C. for 5 hours. This yielded a powder of a positive electrode active material.

The ICP-measured elemental abundance of the obtained positive electrode active material was 0.085% by mass on an elemental erbium basis and 0.006% by mass on an elemental boron basis with respect to lithium cobalt oxide. The molar ratio of the rare earth metal to elemental boron was 1:1.

Among the compounds containing erbium and boric acid adhering to the surface of lithium cobalt oxide, a compound consisting of erbium and boric acid (ErBO$_3$) was predominant. In some cases, however, compounds consisting of erbium, boric acid, and an alkali metal may be in adhesion to the surface of lithium cobalt oxide.

A battery was produced in the same way as in Experimental Example 1, except for the use of the above positive electrode active material powder. The secondary battery produced in this way is hereinafter referred to as battery B1.

The percent retained discharge capacity at low temperatures of battery B1 was determined through the same charge and discharge process as that of batteries A1 to A10. The results including those for batteries A9 and A10 are summarized in Table 2.

TABLE 2

| Battery | Rare earth metal | Rare earth metal content (% by mass) | Elemental boron content (% by mass) | Rare earth metal to elemental boron molar ratio | Percent retained discharge capacity at low temperatures (%) |
|---|---|---|---|---|---|
| B1 | Er | 0.085 | 0.006 | 1:1 | 70 |
| A9 | — | — | — | — | 53 |
| A10 | Er | 0.085 | — | — | 64 |

As is clear from Table 2, battery B1, which incorporated a lithium cobalt oxide surface-modified with compounds containing erbium and boric acid, exhibited a high percent retained discharge at low temperatures compared with batteries A9 and A10 in common with batteries A1 to A8, which incorporated a lithium cobalt oxide surface-modified with compounds containing erbium and silicic acid. This indicates that the adhesion of a compound containing erbium and silicic acid to the surface of lithium cobalt oxide effectively improved ionic conductivity in the same way as that of compounds containing erbium and silicic acid described above.

INDUSTRIAL APPLICABILITY

The present invention is expected to develop into power supplies for driving mobile information terminals such as cellphones, laptops, and smartphones and those for driving high-powered machines such as HEVs and electric tools.

REFERENCE SIGNS LIST

1 . . . Laminated aluminum sheathing body
2 . . . Heal-seal closed portion of the laminated aluminum sheathing body
3 . . . Positive electrode collector tab
4 . . . Negative electrode collector tab
5 . . . Flat electrode body

The invention claimed is:

1. A positive electrode active material for nonaqueous electrolyte secondary batteries, the positive electrode active material comprising a lithium transition metal composite oxide having a compound in contact with a surface thereof, the compound containing a rare earth metal and silicic acid and/or boric acid.

2. The positive electrode active material according to claim 1 for nonaqueous electrolyte secondary batteries, wherein the compound contains a rare earth metal and silicic acid.

3. The positive electrode active material according to claim 1 for nonaqueous electrolyte secondary batteries, wherein the compound contains a rare earth metal and boric acid.

4. The positive electrode active material according to claim 2 for nonaqueous electrolyte secondary batteries, wherein the compound consists of a rare earth metal and silicic acid.

5. The positive electrode active material according to claim 3 for nonaqueous electrolyte secondary batteries, wherein the compound consists of a rare earth metal and boric acid.

6. The positive electrode active material according to claim 1 for nonaqueous electrolyte secondary batteries, wherein the rare earth metal is at least one metal selected from lanthanum, neodymium, samarium, erbium, and ytterbium.

7. A positive electrode for nonaqueous electrolyte secondary batteries, the positive electrode active material comprising a positive electrode collector and a positive electrode mixture layer formed on at least one surface of the positive electrode collector, the positive electrode mixture layer containing a positive electrode active material according to claim 1, a binder, and a conductive agent.

8. A nonaqueous electrolyte secondary battery comprising the positive electrode according to claim 7, a negative electrode, and a nonaqueous electrolyte.

9. The positive electrode active material according to claim 2,
wherein the compound comprises Ln$_2$Si$_2$O$_5$ and Ln is a rare earth metal.

10. The positive electrode active material according to claim 2,
  wherein the compound comprises $Ln_2SiO_7$ and Ln is a rare earth metal.

11. The positive electrode active material according to claim 2,
  wherein the compound comprises $A_xLn_ySiO_z$ and A is an alkali metal, Ln is a rare earth metal, $0 \leq x < 4$, $0 < y \leq 2$, and z is a value that makes a charge of the compound 0.

12. The positive electrode active material according to claim 3,
  wherein the compound comprises $LnBO_3$ and Ln is a rare earth metal.

13. The positive electrode active material according to claim 3,
  wherein the compound comprises $A_aLn_b(BO_3)_3$ and A is an alkali metal, Ln is a rare earth metal, $0 \leq a < 3$, and $0 < b \leq 2$.

14. The positive electrode active material according to claim 3,
  wherein the compound comprises $B_cLn_d(BO_3)_4$ and B is an alkaline earth metal, Ln is a rare earth metal, $0 \leq c < 3$, and $0 < d \leq 2$.

15. A positive electrode active material for nonaqueous electrolyte secondary batteries, the positive electrode active material comprising,
  a lithium transition metal composite oxide with a surface layer,
  wherein the surface layer consists of a rare earth metal, silicic acid and/or boric acid, and optionally an alkali metal.

* * * * *